(12) United States Patent
Sakano et al.

(10) Patent No.: US 10,074,869 B2
(45) Date of Patent: Sep. 11, 2018

(54) FUEL CELL

(71) Applicant: HONDA MOTOR CO., LTD., Tokyo (JP)

(72) Inventors: Masaaki Sakano, Wako (JP); Nagayuki Kanaoka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 7 days.

(21) Appl. No.: 14/094,793

(22) Filed: Dec. 3, 2013

(65) Prior Publication Data

US 2014/0154606 A1 Jun. 5, 2014

(30) Foreign Application Priority Data

Dec. 3, 2012 (JP) ................. 2012-264475

(51) Int. Cl.
| | | |
|---|---|---|
| *H01M 8/10* | (2016.01) | |
| *H01M 8/2483* | (2016.01) | |
| *H01M 8/0271* | (2016.01) | |
| *H01M 8/241* | (2016.01) | |
| *H01M 8/0258* | (2016.01) | |
| *H01M 8/1018* | (2016.01) | |

(52) U.S. Cl.
CPC ....... *H01M 8/2483* (2016.02); *H01M 8/0271* (2013.01); *H01M 8/241* (2013.01); *H01M 8/0258* (2013.01); *H01M 2008/1095* (2013.01)

(58) Field of Classification Search
CPC .. H01M 8/0258–8/0265; H01M 8/242; H01M 8/2483; H01M 8/0271; H01M 8/241; H01M 2008/1095
See application file for complete search history.

(56) References Cited

U.S. PATENT DOCUMENTS

| 8,535,847 B2 | 9/2013 | Tanuma | |
|---|---|---|---|
| 8,808,942 B2 | 8/2014 | Terada et al. | |
| 2004/0091767 A1* | 5/2004 | Zuber | H01M 8/0273 |
| | | | 429/465 |

(Continued)

FOREIGN PATENT DOCUMENTS

| JP | 2005-332672 | 12/2005 |
|---|---|---|
| JP | 2008-192361 | 8/2008 |

(Continued)

OTHER PUBLICATIONS

Japanese Office Action for corresponding JP Application No. 2012-264475, dated Sep. 2, 2014.

(Continued)

*Primary Examiner* — Milton I Cano
*Assistant Examiner* — Philip A. Stuckey
(74) *Attorney, Agent, or Firm* — Mori & Ward, LLP

(57) ABSTRACT

A fuel cell includes a membrane electrode assembly and a first separator. The first separator includes a first reactant gas channel, a first reactant gas manifold, and a first buffer portion. The first buffer portion is located outside of a power generation region of an electrode catalyst layer of the first electrode. The first buffer portion connects the first reactant gas channel to the first reactant gas manifold. A gas diffusion layer of the first electrode extends along a surface of the first separator to a first buffer region facing the first buffer portion. An intermediate layer of the first electrode covers a portion of the gas diffusion layer of the first electrode in the first buffer region.

23 Claims, 5 Drawing Sheets

(56) References Cited

U.S. PATENT DOCUMENTS

| | | | | |
|---|---|---|---|---|
| 2005/0186464 | A1* | 8/2005 | Sugiura et al. | 429/38 |
| 2005/0271929 | A1* | 12/2005 | Sompalli | H01M 4/8605 429/465 |
| 2008/0145712 | A1* | 6/2008 | Pierpont | B32B 37/203 429/509 |
| 2009/0053573 | A1* | 2/2009 | Shibata | H01M 8/0247 429/481 |
| 2009/0075134 | A1* | 3/2009 | Tanaka | H01M 8/0206 429/434 |
| 2009/0136811 | A1* | 5/2009 | Kusakabe | H01M 8/0273 429/492 |
| 2010/0062304 | A1* | 3/2010 | Okanishi | H01M 8/0273 429/481 |
| 2010/0098983 | A1* | 4/2010 | Goto | H01M 8/0245 429/450 |
| 2010/0221638 | A1* | 9/2010 | Terada et al. | 429/483 |
| 2011/0039189 | A1 | 2/2011 | Tanuma | |
| 2011/0053029 | A1* | 3/2011 | Kim | H01M 8/0273 429/452 |
| 2011/0165498 | A1* | 7/2011 | Akita | 429/492 |

FOREIGN PATENT DOCUMENTS

| | | |
|---|---|---|
| JP | 2010-040377 | 2/2010 |
| JP | 2010-108685 | 5/2010 |
| JP | 2010-192239 | 9/2010 |
| JP | 2010-205484 | 9/2010 |
| JP | 2011-146300 | 7/2011 |
| JP | 2011-243427 | 12/2011 |
| JP | 2012-089308 | 5/2012 |
| JP | 2012-89308 | 5/2012 |
| WO | WO 2009/151013 | 12/2009 |

OTHER PUBLICATIONS

Japanese Office Action for corresponding JP Application No. 2012-264475, dated Mar. 13, 2015.

Chinese Office Action for corresponding CN Application No. 201310585542.5, dated Jul. 2, 2015.

* cited by examiner

BACKGROUND ART

FUEL CELL

CROSS-REFERENCE TO RELATED APPLICATIONS

The present application claims priority under 35 U.S.C. § 119 to Japanese Patent Application No. 2012-264475, filed Dec. 3, 2012, entitled "Fuel Cell." The contents of this application are incorporated herein by reference in their entirety.

BACKGROUND

1. Field

The present disclosure relates to a fuel cell.

2. Description of the Related Art

For example, a solid polymer electrolyte fuel cell includes a solid polymer electrolyte membrane made from a solid polymer ion-exchange membrane. The fuel cell includes a membrane electrode assembly (MEA) and separators (bipolar plates) sandwiching the MEA therebetween. The membrane electrode assembly includes a solid polymer electrolyte membrane, and an anode electrode and a cathode electrode sandwiching the solid polymer electrolyte membrane therebetween. Each of the anode and cathode electrodes includes a catalyst layer (an electrode catalyst layer) and a gas diffusion layer (porous carbon). Typically, a predetermined number of such fuel cells are stacked and used as a vehicle fuel cell stack.

In general, in a membrane electrode assembly, an anode electrode and a cathode electrode each has a surface area smaller than that of a solid polymer electrolyte membrane. An outer peripheral portion of the solid polymer electrolyte membrane protrudes outward from the outer peripheries of the anode electrode and the cathode electrode. Therefore, there is a problem in that, in the process of manufacturing the membrane electrode assembly, when bonding the gas diffusion layer to the solid polymer electrolyte membrane by hot press bonding, fibers (carbon fibers) of the gas diffusion layer may penetrate into the solid polymer electrolyte membrane.

Japanese Unexamined Patent Application Publication No. 2011-146300, for example, discloses a fuel cell for solving this problem. In the fuel cell, as illustrated in FIG. 5, a membrane electrode assembly 4 includes an electrolyte membrane 1, a cathode-side catalyst layer 2a, and an anode-side catalyst layer 3a. The membrane electrode assembly 4 is sandwiched between a cathode-side gas diffusion layer 2b and an anode-side gas diffusion layer 3b. The surface area of each of the catalyst layers 2a and 3a is smaller than that of the electrolyte membrane 1. Therefore, there is an exposed portion 1a, on which the catalyst layers 2a and 3a are not present, in outer peripheral portions of the electrolyte membrane 1.

Recesses 5a and 5b are respectively formed in end portions of each of the gas diffusion layers 2b and 3b, which are disposed on both sides of the membrane electrode assembly 4, at positions corresponding to the peripheries of the catalyst layers 2a and 3a. Resin members 6a and 6b are disposed in grooves defined by the recesses 5a and 5b and the exposed portions 1a so as to extend from the catalyst layers 2a and 3a to the exposed portions 1a. Therefore, the electrolyte membrane 1 is protected from penetration of fibers protruding from the gas diffusion layers 2b and 3b.

SUMMARY

According to one aspect of the present invention, a fuel cell includes a membrane electrode assembly and a first separator. The membrane electrode assembly includes a first electrode, a second electrode, and a solid polymer electrolyte membrane. The first electrode includes an electrode catalyst layer, an intermediate layer, and a gas diffusion layer. The second electrode includes an electrode catalyst layer, an intermediate layer, and a gas diffusion layer. The solid polymer electrolyte membrane is provided between the first electrode and the second electrode. The first separator is stacked on the membrane electrode assembly in a stacking direction. The first separator includes a first reactant gas channel, a first reactant gas manifold, and a first buffer portion. A reactant gas is to flow through the first reactant gas channel in a space between the first separator and the membrane electrode assembly along a power generation surface of the membrane electrode assembly. The reactant gas is to flow in the stacking direction through the first reactant gas manifold. The first buffer portion is located outside of a power generation region of the electrode catalyst layer of the first electrode. The first buffer portion connects the first reactant gas channel to the first reactant gas manifold. The gas diffusion layer of the first electrode extends along a surface of the first separator to a first buffer region facing the first buffer portion. The intermediate layer of the first electrode covers a portion of the gas diffusion layer of the first electrode in the first buffer region.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
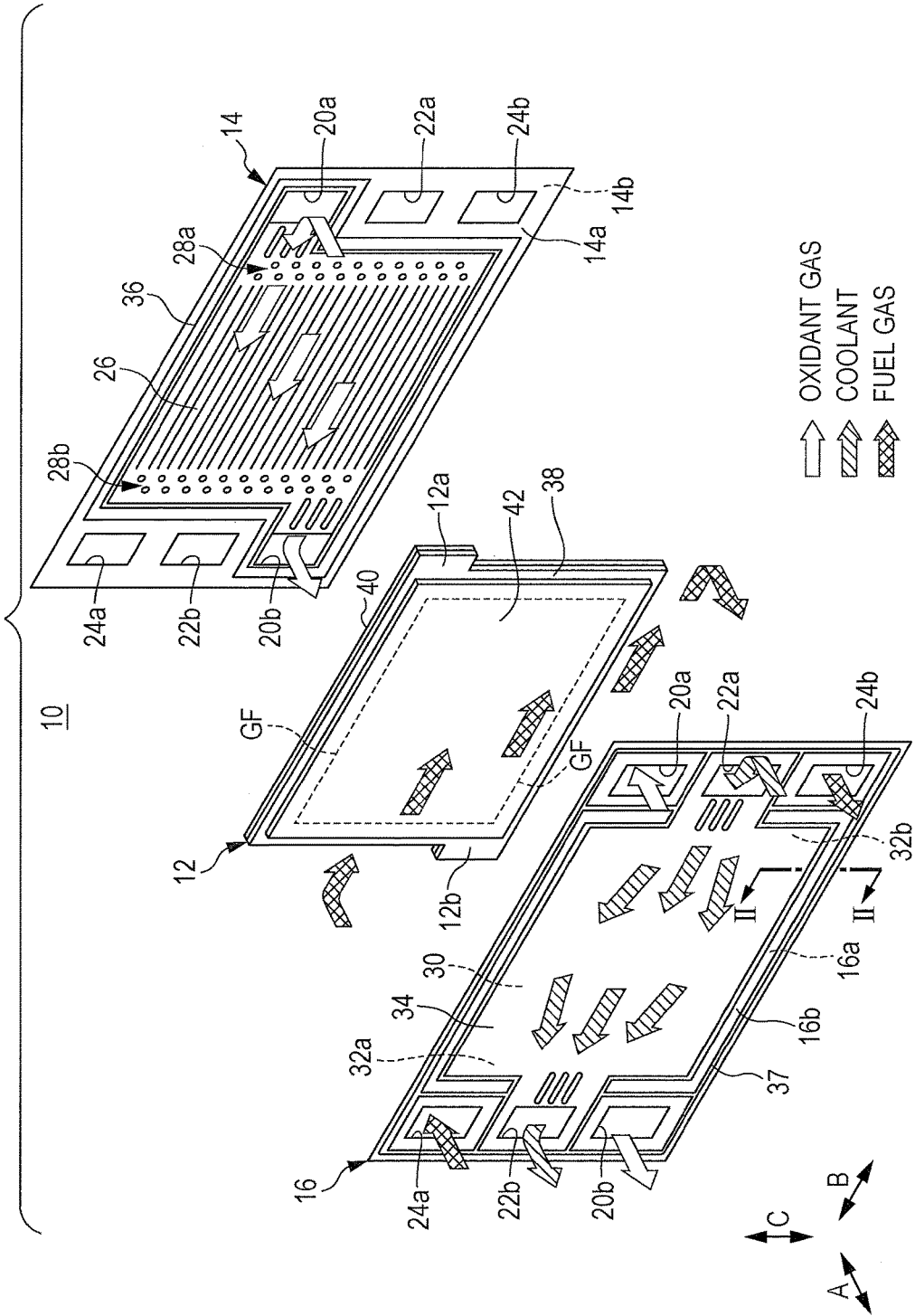
FIG. 1 is an exploded perspective view of a fuel cell according to an embodiment of the present disclosure.

The embodiments will now be described with reference to the accompanying drawings, wherein like reference numerals designate corresponding or identical elements throughout the various drawings.

Figure 2:
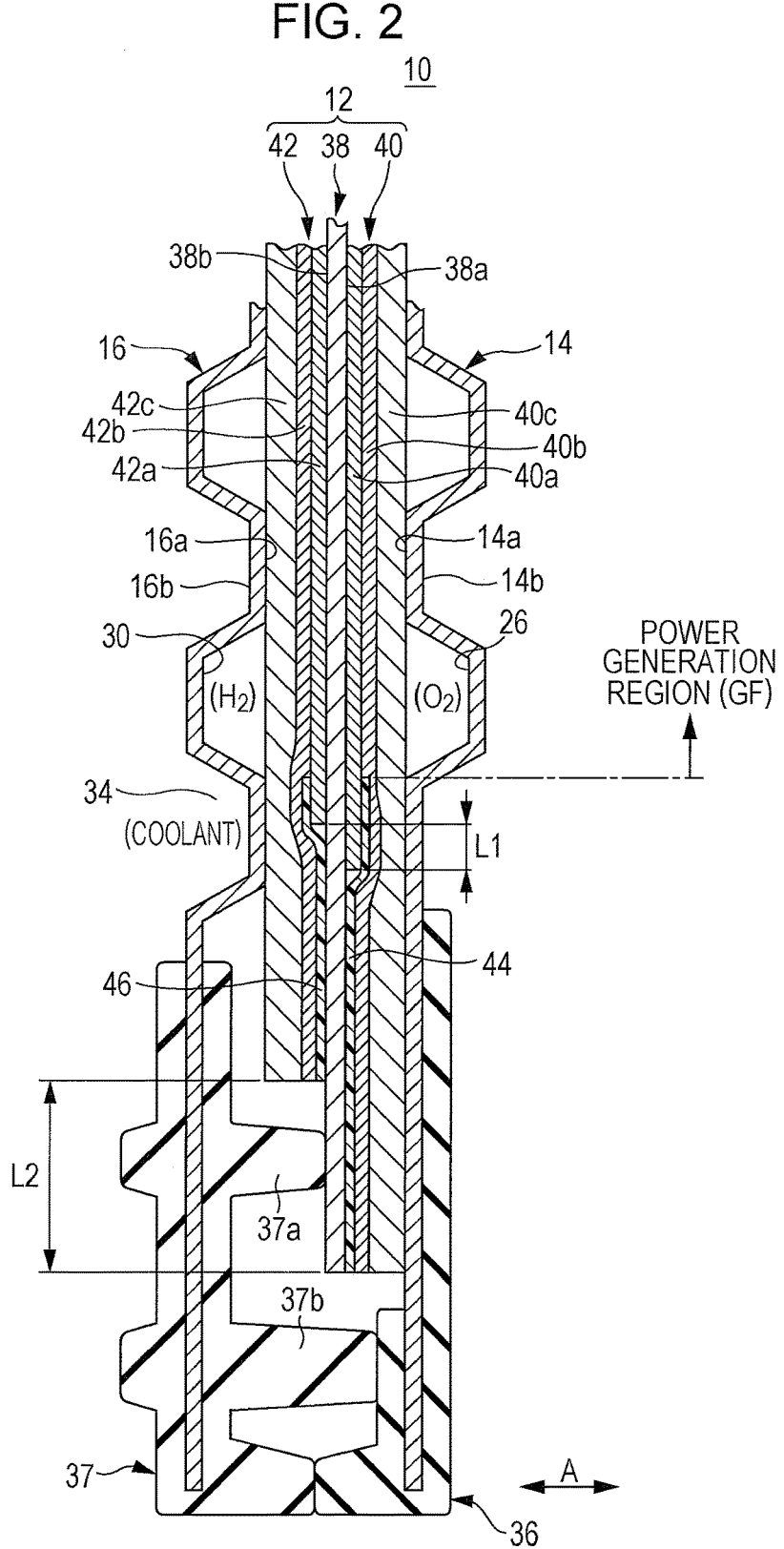
FIG. 2 is a sectional view of the fuel cell taken along line II-II in FIG. 1.

As illustrated in FIGS. 1 and 2, a fuel cell 10 according to an embodiment of the present disclosure includes a membrane electrode assembly 12, and a cathode separator 14 and an anode separator 16 sandwiching the membrane electrode assembly 12 therebetween. The fuel cells 10 are stacked in the direction of arrow A so as to form, for example, a fuel cell stack for automobiles.

Each of the cathode separator 14 and the anode separator 16 is a thin metal separator made from, for example, a steel plate, a stainless steel plate, an aluminum plate, a galvanized steel plate, or any of such metal plates having an anticorrosive coating on the surface thereof.

As illustrated in FIG. 1, an oxidant gas inlet manifold 20a, a coolant inlet manifold 22a, and a fuel gas outlet manifold 24b are formed in the fuel cell 10 so as to extend in the direction of arrow A through one end portion of the fuel cell 10 in the direction of arrow B (horizontal direction in FIG. 1). The manifolds 20a, 22a, and 24b are arranged in the direction of arrow C (vertical direction). An oxidant gas, such as an oxygen-containing gas, is supplied through the oxidant gas inlet manifold 20a. A coolant is supplied through the coolant inlet manifold 22a. A fuel gas, such as a hydrogen-containing gas, is discharged through the fuel gas outlet manifold 24b.

A fuel gas inlet manifold 24a, a coolant outlet manifold 22b, and an oxidant gas outlet manifold 20b are formed in the fuel cell 10 so as to extend in the direction of arrow A through the other end portion of the fuel cell 10 in the direction of arrow B. The manifolds 24a, 22b, and 20b are arranged in the direction of arrow C (vertical direction). The fuel gas is supplied through the fuel gas inlet manifold 24a. The coolant is discharged through the coolant outlet manifold 22b. The oxidant gas is discharged through the oxidant gas outlet manifold 20b.

Figure 3:
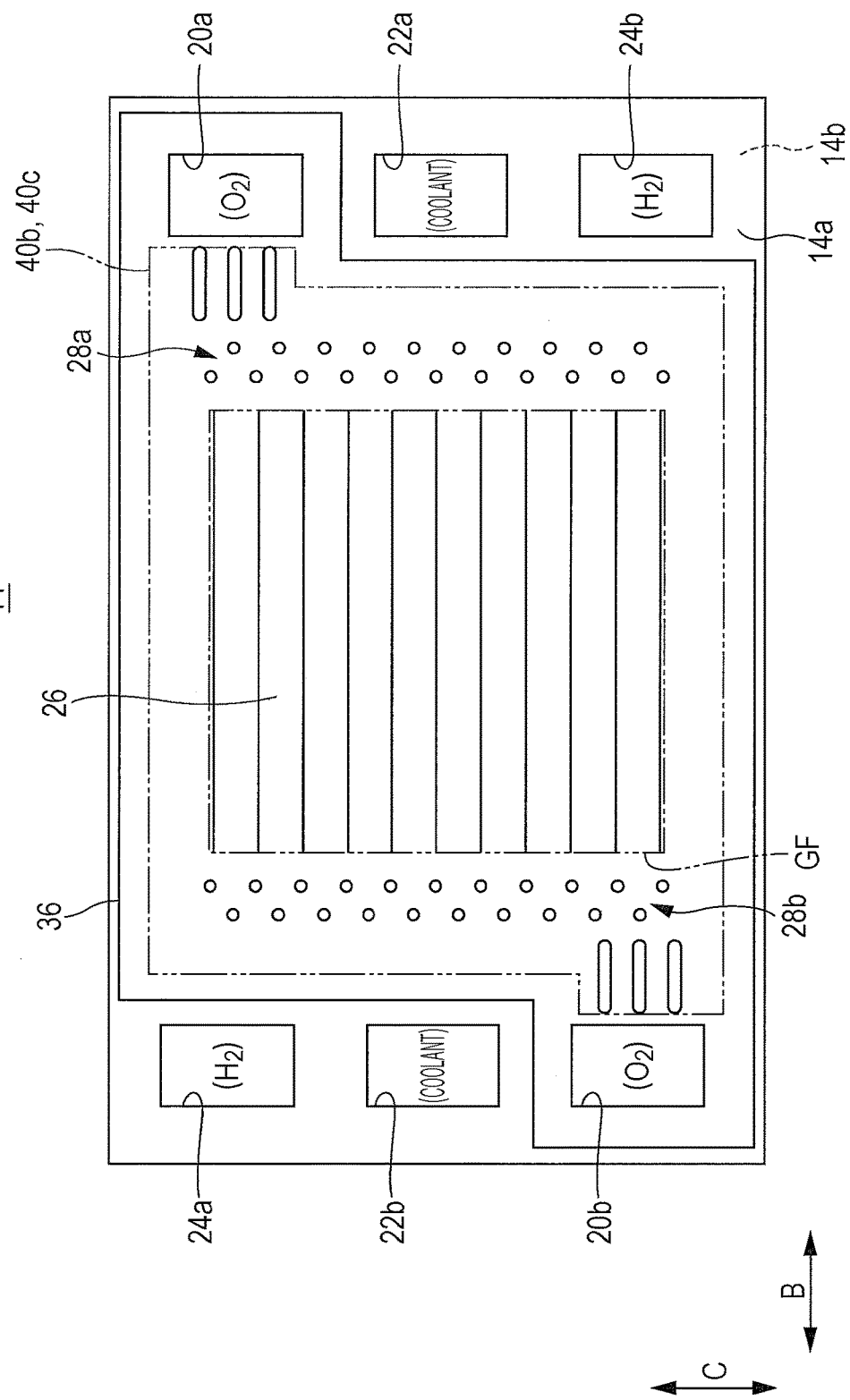
FIG. 3 is a plan view of a cathode separator of the fuel cell.

As illustrated in FIGS. 1 and 3, an oxidant gas channel 26, which is connected to the oxidant gas inlet manifold 20a and to the oxidant gas outlet manifold 20b, is formed on a surface 14a of the cathode separator 14 facing the membrane electrode assembly 12. The oxidant gas channel 26 linearly extends in the direction of arrow B. The oxidant gas channel 26 may be formed in a wave-like pattern so as to extend in the direction of arrow B. An inlet buffer portion 28a is disposed between the inlet side of the oxidant gas channel 26 and the oxidant gas inlet manifold 20a. The oxidant gas inlet manifold 20a is connected to the oxidant gas channel 26 through the inlet buffer portion 28a. An outlet buffer portion 28b is disposed between the outlet side of the oxidant gas channel 26 and the oxidant gas outlet manifold 20b. The oxidant gas outlet manifold 20b is connected to the oxidant gas channel 26 through the outlet buffer portion 28b.

The inlet buffer portion 28a and the outlet buffer portion 28b have a function of diffusing the oxidant gas and making the flow of the oxidant gas smooth and uniform. For example, each of the buffer portions 28a and 28b includes embossed portions.

Figure 4:
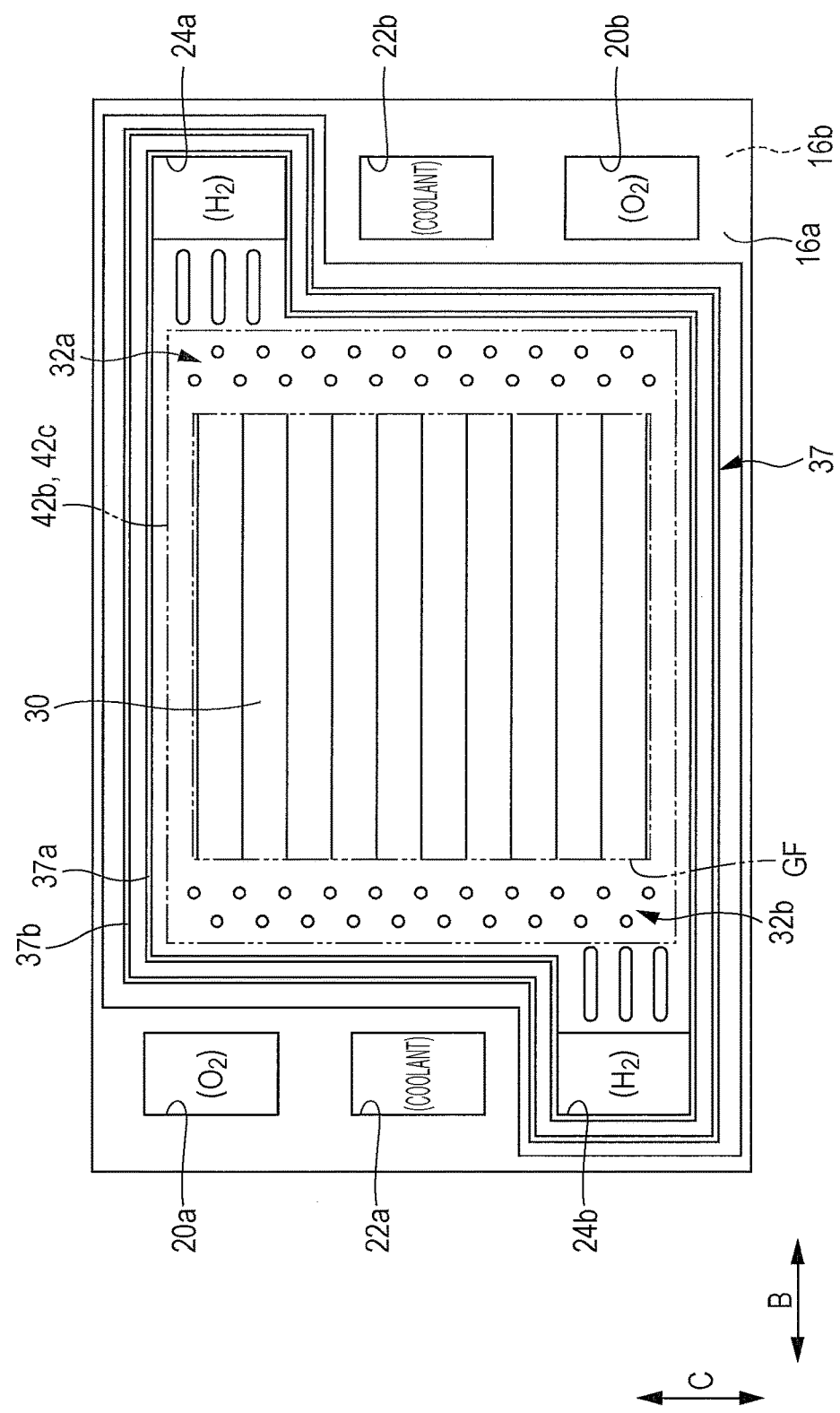
FIG. 4 is a plan view of an anode separator of the fuel cell.
Figure 5:
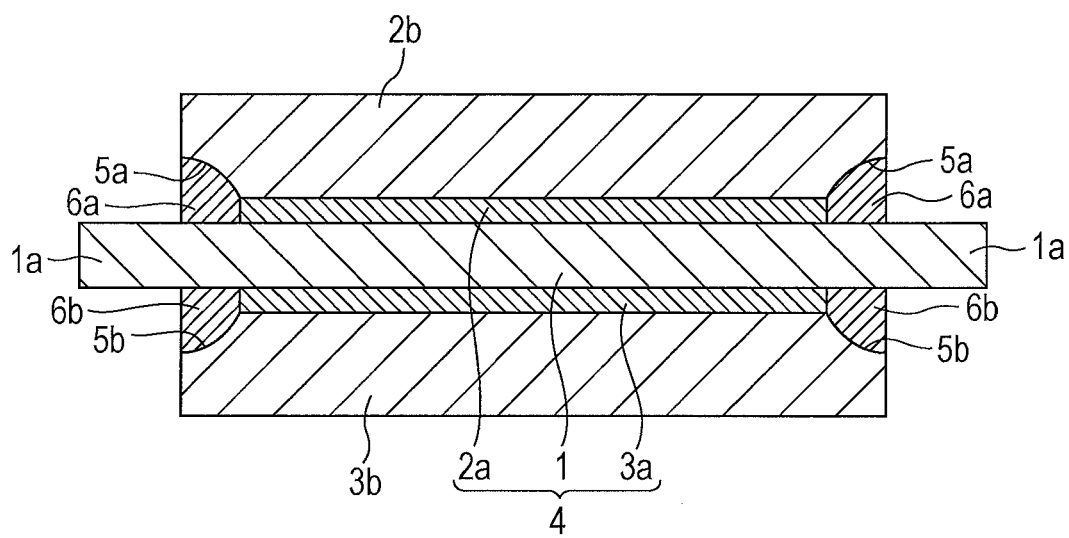
FIG. 5 illustrates a fuel cell according to a related art example.

As illustrated in FIG. 4, a fuel gas channel 30, which is connected to the fuel gas inlet manifold 24a and to the fuel gas outlet manifold 24b, is formed on a surface 16a of the anode separator 16 facing the membrane electrode assembly 12. The fuel gas channel 30 linearly extends in the direction of arrow B. The fuel gas channel 30 may be formed in a wave-like pattern so as to extend in the direction of arrow B. An inlet buffer portion 32a is disposed between the inlet side of the fuel gas channel 30 and the fuel gas inlet manifold 24a. The fuel gas inlet manifold 24a is connected to the fuel gas channel 30 through the inlet buffer portion 32a. An outlet buffer portion 32b is disposed between the outlet side of the fuel gas channel 30 and the fuel gas outlet manifold 24b. The fuel gas outlet manifold 24b is connected to the fuel gas channel 30 through the outlet buffer portion 32b.

The inlet buffer portion 32a and the outlet buffer portion 32b have a function of diffusing the fuel gas and making the flow of the fuel gas smooth and uniform. For example, each of the buffer portions 32a and 32b includes embossed portions.

A coolant channel 34 is formed between a surface 14b of the cathode separator 14 and a surface 16b of the anode separator 16. The coolant channel 34 is connected to the coolant inlet manifold 22a and to the coolant outlet manifold 22b.

As illustrated in FIGS. 1 to 3, on the surfaces 14a and 14b of the cathode separator 14, a first sealing member 36 is integrally formed around the outer periphery of the cathode separator 14. As illustrated in FIGS. 1, 2 and 4, on the surfaces 16a and 16b of the anode separator 16, a second sealing member 37 is integrally formed around the outer periphery of the anode separator 16.

As illustrated in FIGS. 2 and 4, the second sealing member 37 includes a first protruding seal 37a and a second protruding seal 37b. The first protruding seal 37a is in contact with an outer peripheral portion of a solid polymer electrolyte membrane 38 described below. The second protruding seal 37b is in contact with an outer peripheral portion of the first sealing member 36 of the cathode separator 14. As illustrated in FIGS. 2 and 3, the first sealing member 36 includes a thin flat seal that is uniformly formed on the separator surface. Instead of the second protruding seal 37b, the first sealing member 36 may have a second protruding seal (not shown).

Each of the first sealing member 36 and the second sealing member 37 is made from an elastic material such as a sealing material, a cushioning material, or a packing material. Examples of such materials include EPDM, NBR, fluorocarbon rubber, silicone rubber, fluorosilicone rubber, butyl rubber, natural rubber, styrene rubber, chloroprene-rubber, and acrylic rubber.

As illustrated in FIGS. 1 and 2, the membrane electrode assembly 12 includes the solid polymer electrolyte membrane 38, and a cathode electrode 40 and an anode electrode 42 sandwiching the solid polymer electrolyte membrane 38 therebetween. The solid polymer electrolyte membrane 38 is, for example, a thin film made of a perfluorosulfonate polymer that is impregnated with water. The cathode electrode 40 has surface dimensions (outside dimensions) that are larger than those of the anode electrode 42 and that are the same as those of the solid polymer electrolyte membrane 38. Alternatively, the anode electrode 42 may have surface dimensions that are larger than those of the cathode electrode 40 and that are the same as those of the solid polymer electrolyte membrane 38.

As necessary, the membrane electrode assembly 12 may include a protruding portion 12a and a protruding portion 12b as illustrated in FIG. 1. The protruding portion 12a, serving as a connection channel portion, forms a part of the inlet buffer portion 28a for the oxidant gas. The protruding portion 12b, serving as a connection channel portion, forms a part of the outlet buffer portion 28b for the oxidant gas.

The solid polymer electrolyte membrane 38 is made of a fluoropolymer electrolyte, a hydrocarbon (HC) polymer electrolyte, or the like. The solid polymer electrolyte membrane 38 may be made of a material whose principal chain has a polyphenylene structure and whose side chain includes a sulfonic group.

As illustrated in FIG. 2, the cathode electrode 40 includes a first electrode catalyst layer 40a, a first gas diffusion layer 40c, and a first intermediate layer 40b disposed between these layers 40a and 40c. The first electrode catalyst layer 40a is formed on a surface 38a of the solid polymer electrolyte membrane 38 by uniformly coating the surface 38a with porous carbon particles whose surfaces support a platinum alloy. The first gas diffusion layer 40c is made of carbon paper or the like. The first electrode catalyst layer 40a and the first intermediate layer 40b may each include a plurality of layers. The anode electrode 42 described below has a similar structure.

The first electrode catalyst layer 40a has surface dimensions that are smaller than those of the first gas diffusion layer 40c. Each of the first gas diffusion layer 40c and the first intermediate layer 40b has surface dimensions that are the same as those of the solid polymer electrolyte membrane 38. The first electrode catalyst layer 40a forms a power generation region GF.

As illustrated in FIG. 3, the first gas diffusion layer 40c extends outward from the power generation region GF along the in-plane direction of the separator to buffer regions facing the inlet buffer portion 28a and the outlet buffer portion 28b for the oxidant gas. The first intermediate layer 40b covers portions of the first gas diffusion layer 40c in the buffer regions.

In the present embodiment, the first intermediate layer 40b has outer dimensions that are the same as those of the first gas diffusion layer 40c. The first intermediate layer 40b covers the entire surface of the solid polymer electrolyte membrane 38. The first intermediate layer 40b, the first gas diffusion layer 40c, and the solid polymer electrolyte membrane 38 have protruding shapes corresponding to the protruding portions 12a and 12b.

The first intermediate layer 40b is formed by applying a paste on the first gas diffusion layer 40c. The paste is made of a material including an electroconductive substance, a water-repellent resin, and a solvent. It is preferable that the first intermediate layer 40b be formed by applying the paste to the entire surface of the first gas diffusion layer 40c. Examples of the electroconductive substance include a porous carbon, a micro-porous layer (MPL), and a fibrous carbon (preferably, carbon whiskers or carbon nanotubes). The water-repellent resin may include at least one of a crystalline fluororesin, a polyvinylidene fluoride (PVDF), a polyvinyl fluoride (PVF), a polytetrafluoroethylene (PTFE), an amorphous fluororesin, and a silicone resin.

As illustrated in FIG. 2, in the buffer region, the cathode electrode 40 further includes a first adhesive layer 44. The first intermediate layer 40b is disposed between the solid polymer electrolyte membrane 38 and the first gas diffusion layer 40c, and the first adhesive layer 44 is disposed between the solid polymer electrolyte membrane 38 and the first intermediate layer 40b. The first adhesive layer 44 includes an overlapping portion that overlaps an outer peripheral portion of the first electrode catalyst layer 40a in the stacking direction.

The first adhesive layer 44 is made from, for example, a reactive liquid adhesive, such as a silicone-based adhesive, a urethane-based adhesive, or an epoxy-based adhesive; or a hot-melt adhesive, such as a urethane-based adhesive, an ester-based adhesive, an epoxy-based adhesive, an amide-based adhesive, or an olefin-based adhesive. Application of the adhesive may be performed by using a spray or a dispenser, or by using a screen-printing method, an ink-jet method, an immersion method, or the like.

The anode electrode 42 includes a second electrode catalyst layer 42a, a second gas diffusion layer 42c, and a second intermediate layer 42b disposed between these layers 42a and 42c. The second electrode catalyst layer 42a is formed on a surface 38b of the solid polymer electrolyte membrane 38 by uniformly coating the surface 38b with porous carbon particles whose surfaces support a platinum alloy. The second gas diffusion layer 42c is made of carbon paper or the like.

The second electrode catalyst layer 42a has surface dimensions that are smaller than those of each of the second gas diffusion layer 42c and the second intermediate layer 42b. The second gas diffusion layer 42c has surface dimensions that are the same as those of the second intermediate layer 42b. Each of the second gas diffusion layer 42c and the second intermediate layer 42b has surface dimensions that are smaller than those of the solid polymer electrolyte membrane 38. The second intermediate layer 42b has a structure similar to that of the first intermediate layer 40b. The power generation region GF is formed in a region in which the first and second intermediate layers 40b and 42b overlap in the stacking direction. It is preferable that the second intermediate layer 42b be formed on the entire surface of the second gas diffusion layer 42c.

The second electrode catalyst layer 42a has surface dimensions that are different from those of the first electrode catalyst layer 40a. In the present embodiment, the second electrode catalyst layer 42a has surface dimensions smaller than those of the first electrode catalyst layer 40a. The outer peripheral portion of the first electrode catalyst layer 40a protrudes outward from the outer peripheral portion of the second electrode catalyst layer 42a by a distance L1 over the entire periphery. The value of the distance L1 may be appropriately set in accordance with the positions on the outer peripheral portion. Alternatively, the first electrode catalyst layer 40a may have surface dimensions that are smaller than those of the second electrode catalyst layer 42a.

The second gas diffusion layer 42c has surface dimensions smaller than those of each of the first gas diffusion layer 40c and the solid polymer electrolyte membrane 38. To be specific, the outer peripheral portion of each of the first gas diffusion layer 40c and the solid polymer electrolyte membrane 38 protrudes outward from the outer peripheral portion of the second gas diffusion layer 42c by a distance L2 over the entire periphery.

As illustrated in FIG. 4, the second gas diffusion layer 42c extends outward from the power generation region GF along the in-plane direction of the separator to buffer regions facing the inlet buffer portion 32a and the outlet buffer portion 32b for the fuel gas. The second intermediate layer 42b covers portions of the second gas diffusion layer 42c in the buffer regions.

As illustrated in FIG. 2, in the buffer region, the anode electrode 42 further includes a second adhesive layer 46. The second intermediate layer 42b is disposed between the solid polymer electrolyte membrane 38 and the second gas diffusion layer 42c, and the second adhesive layer 46 is disposed between the solid polymer electrolyte membrane 38 and the second intermediate layer 42b. The second adhesive layer 46 includes an overlapping portion that overlaps an outer peripheral portion of the second electrode catalyst layer 42a in the stacking direction. The second adhesive layer 46 has a structure similar to that of the first adhesive layer 44.

The operation of the fuel cell 10 will be described below.

First, as illustrated in FIG. 1, an oxidant gas, such as an oxygen-containing gas, is supplied to the oxidant gas inlet manifold 20a. A fuel gas, such as a hydrogen-containing gas, is supplied to the fuel gas inlet manifold 24a. A coolant, such as pure water, ethylene glycol, a cooling oil, or the like, is supplied to the coolant inlet manifold 22a.

The oxidant gas flows through the oxidant gas inlet manifold 20a and through the oxidant gas channel 26 of the cathode separator 14 in the direction of arrow B, and the oxidant gas is supplied to the cathode electrode 40 of the membrane electrode assembly 12. The fuel gas flows through the fuel gas inlet manifold 24a to the fuel gas channel 30 of the anode separator 16. The fuel gas moves along the fuel gas channel 30 in the direction of arrow B and is supplied to the anode electrode 42 of the membrane electrode assembly 12.

Accordingly, in the membrane electrode assembly 12, the oxidant gas supplied to the cathode electrode 40 and the fuel gas supplied to the anode electrode 42 are respectively consumed in electrochemical reactions in the first electrode catalyst layer 40a and the second electrode catalyst layer 42a, and thereby electric power is generated.

Next, the oxidant gas, which has been supplied to the cathode electrode 40 and consumed, is discharged through the oxidant gas outlet manifold 20b in the direction of arrow A. Likewise, the fuel gas, which has been supplied to the anode electrode 42 and consumed, is discharged through the fuel gas outlet manifold 24b in the direction of arrow A.

The coolant supplied to the coolant inlet manifold 22a is introduced into the coolant channel 34 between the cathode separator 14 and the anode separator 16, and then flows in the direction of arrow B. The coolant cools the membrane electrode assembly 12 and then is discharged through the coolant outlet manifold 22b.

In the present embodiment, as illustrated in FIGS. 2 and 3, the first gas diffusion layer 40c and the first intermediate layer 40b of the cathode electrode 40 extend to the buffer regions located outside of the power generation region GF. Therefore, the first gas diffusion layer 40c and the solid polymer electrolyte membrane 38 do not directly contact each other in the power generation region GF and in the vicinity of the power generation region GF. Therefore, with a simple structure, carbon fibers included the first gas diffusion layer 40c are prevented from penetrating into the solid polymer electrolyte membrane 38.

As illustrated in FIGS. 2 and 4, the second gas diffusion layer 42c and the second intermediate layer 42b of the anode electrode 42 extend to the buffer regions located outside of the power generation region GF. Therefore, the second gas diffusion layer 42c and the solid polymer electrolyte membrane 38 do not directly contact each other in the power generation region GF and in the vicinity of the power generation region GF. Therefore, with a simple structure, carbon fibers included the second gas diffusion layer 42c are prevented from penetrating into the solid polymer electrolyte membrane 38. As a result, the solid polymer electrolyte membrane 38 can be reliably protected.

Moreover, the first adhesive layer 44 and the second adhesive layer 46 are respectively disposed between the solid polymer electrolyte membrane 38 and the first intermediate layer 40b and between the solid polymer electrolyte membrane 38 and the second intermediate layer 42b. Therefore, an adhesive applied to a surface of the solid polymer electrolyte membrane 38 passes through the first intermediate layer 40b and infiltrates into the first gas diffusion layer 40c, and an adhesive applied to another surface of the solid polymer electrolyte membrane 38 passes through the second intermediate layer 42b and infiltrates into the second gas diffusion layer 42c. Therefore, the solid polymer electrolyte membrane 38 can be reliably bonded to the first gas diffusion layer 40c and to the second gas diffusion layer 42c.

Moreover, infiltration of the adhesive into the first gas diffusion layer 40c, which is a porous layer, between the solid polymer electrolyte membrane 38 and the first intermediate layer 40b is suppressed; and infiltration of the adhesive into the second gas diffusion layer 42c, which is a porous layer, between the solid polymer electrolyte membrane 38 and the second intermediate layer 42b is suppressed. Therefore, a space in which the adhesive is not present is unlikely to be formed, and therefore a uniform bonding surface can be formed.

Thus, for example, it is possible to reliably prevent occurrence of stress concentration due to a nonuniformly bonded surface and penetration of carbon fibers, which may occur when the solid polymer electrolyte membrane 38 repeats swelling and contraction due to a variation of water content caused by a start and stop operation. Therefore, a high stress is not applied to the solid polymer electrolyte membrane 38, and it is possible to suppress damage to the solid polymer electrolyte membrane 38.

Furthermore, the adhesive is cured by applying a predetermined pressure when integrating the solid polymer electrolyte membrane 38, the first gas diffusion layer 40c, and the second gas diffusion layer 42c to each other. The first intermediate layer 40b and the second intermediate layer 42b respectively cover the first adhesive layer 44 and the second adhesive layer 46. Therefore, the adhesive does not pass through the first gas diffusion layer 40c and the second gas diffusion layer 42c and does not seep to the surfaces of the membrane electrode assembly 12 (MEA surfaces). Thus, an increase in surface energy of the MEA surface is suppressed, generated water does not easily adhere to the surfaces, and the generated water can be efficiently drained. As a result, power generation can be reliably and stably performed.

Because a space is not generated in the first adhesive layer 44 and the second adhesive layer 46, generation of radicals due to cross-leak of the oxidant gas and the fuel gas during an idle time, during OCV measurement, or the like can be prevented. Therefore, degradation of the solid polymer electrolyte membrane 38, in particular, degradation of a peripheral portion of the solid polymer electrolyte membrane 38 can be reliably suppressed.

According to an aspect of the embodiment, a fuel cell includes a membrane electrode assembly including a solid polymer electrolyte membrane and a pair of electrodes sandwiching the solid polymer electrolyte membrane therebetween. The electrodes each include an electrode catalyst layer, an intermediate layer, and a gas diffusion layer; and a separator stacked on the membrane electrode assembly. The separator includes a reactant gas channel through which a reactant gas flows through a space between the separator and the membrane electrode assembly along a power generation surface, a reactant gas manifold through which the reactant gas flows in a stacking direction of the separator and the membrane electrode assembly, and a buffer portion located outside of a power generation region of the electrode catalyst layer, the buffer portion connecting the reactant gas channel and the reactant gas manifold to each other.

In the fuel cell according to the embodiment, the gas diffusion layer extends in an in-plane direction of the separator to a region facing the buffer portion, and the intermediate layer covers a portion of the gas diffusion layer in the region facing the buffer portion.

In the fuel cell according to the embodiment, it is preferable that the intermediate layer be disposed between the solid polymer electrolyte membrane and the gas diffusion layer, that the membrane electrode assembly further include an adhesive layer in the region facing the buffer portion, that the adhesive layer be located between the solid polymer electrolyte membrane and the intermediate layer, and that the adhesive layer include an overlapping portion that overlaps an outer peripheral portion of the electrode catalyst layer in the stacking direction.

In the fuel cell according to the embodiment, it is preferable that surface dimensions of one of the gas diffusion layers located on one side of the solid polymer electrolyte membrane be different from surface dimensions of the other gas diffusion layer located on the other side of the solid polymer electrolyte membrane, and that surface dimensions of one of the electrode catalyst layers located on one side of the solid polymer electrolyte membrane be different from surface dimensions of the other electrode catalyst layer located on the other side of the solid polymer electrolyte membrane.

In the fuel cell according to the embodiment, it is preferable that the intermediate layer be formed over the entire area of the gas diffusion layer.

With the aspect of the embodiment, the gas diffusion layer and the intermediate layer extend to a region facing the buffer portion, which is located outside of the power generation region of the electrode catalyst layer. Thus, direct contact between the gas diffusion layer and the solid polymer electrolyte membrane in the power generation region and in the vicinity of the power generation region can be appropriately prevented. Therefore, with a simple structure, fibers of the gas diffusion layer are prevented from penetrating into the solid polymer electrolyte membrane. Accordingly, the solid polymer electrolyte membrane can be reliably protected and power generation can be appropriately and stably performed.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell comprising:
a membrane electrode assembly comprising:
  a first electrode including an electrode catalyst layer, an intermediate layer, and a gas diffusion layer;
  a second electrode including an electrode catalyst layer, an intermediate layer, and a gas diffusion layer; and
  a solid polymer electrolyte membrane provided between the first electrode and the second electrode; and
a first separator stacked on the membrane electrode assembly in a stacking direction, the first separator comprising:
  a first reactant gas channel through which a reactant gas is to flow in a space between the first separator and the membrane electrode assembly along a power generation surface of the membrane electrode assembly;
  a first reactant gas manifold through which the reactant gas is to flow in the stacking direction; and
  a first buffer portion located outside of a power generation region of the electrode catalyst layer of the first electrode, the first buffer portion formed by a portion of the first separator that extends from the first reactant gas channel, the first buffer portion fluidly connecting the first reactant gas channel to the first reactant gas manifold,
wherein the gas diffusion layer of the first electrode extends along a surface of the first separator to a first buffer region of the membrane electrode assembly facing the first buffer portion, and the intermediate layer of the first electrode covers a portion of the gas diffusion layer of the first electrode in the first buffer region,
wherein the first buffer region directly faces, in the stacking direction, a part of the first buffer portion that is disposed directly between the first reactant gas manifold and the first reactant gas channel, and a portion of the intermediate layer of the first electrode in the first buffer region does not overlap the electrode catalyst layer of the first electrode in the stacking direction,
wherein the membrane electrode assembly includes an adhesive layer in the first buffer region, the adhesive layer being located between the solid polymer electrolyte membrane and the intermediate layer of the first electrode, and
wherein the adhesive layer includes an overlapping portion that overlaps an outer peripheral portion of the electrode catalyst layer and the intermediate layer of the first electrode in the stacking direction.

2. The fuel cell according to claim 1,
wherein surface dimensions of the gas diffusion layer of the first electrode located on one side of the solid polymer electrolyte membrane are different from surface dimensions of the gas diffusion layer of the second electrode located on another side of the solid polymer electrolyte membrane, and
wherein surface dimensions of the electrode catalyst layer of the first electrode located on one side of the solid polymer electrolyte membrane are different from surface dimensions of the electrode catalyst layer of the second electrode located on another side of the solid polymer electrolyte membrane.

3. The fuel cell according to claim 1,
wherein the intermediate layer of the first electrode is provided over an entire area of the gas diffusion layer of the first electrode.

4. The fuel cell according to claim 1, further comprising:
a second separator provided on an opposite side of the first separator with respect to the membrane electrode assembly in the stacking direction, the second separator comprising:
  a second reactant gas channel through which a reactant gas is to flow in a space between the second separator and the membrane electrode assembly along a power generation surface of the membrane electrode assembly;
  a second reactant gas manifold through which the reactant gas is to flow in the stacking direction; and
  a second buffer portion located outside of a power generation region of the electrode catalyst layer of the second electrode, the second buffer portion formed by a portion of the second separator that extends from the second reactant gas channel, the second buffer portion connecting the second reactant gas channel to the second reactant gas manifold,
wherein the gas diffusion layer of the second electrode extends along a surface of the second separator to a second buffer region of the membrane electrode assembly facing the second buffer portion, and the intermediate layer of the second electrode covers a portion of the gas diffusion layer of the second electrode in the second buffer region.

5. The fuel cell according to claim 1, wherein the entirety of the first buffer portion is located outside of the power generation region.

6. The fuel cell according to claim 1, wherein the power generation region includes a top edge and a bottom edge separated by a distance, and the first buffer portion extends along the distance from the top edge to the bottom edge.

7. The fuel cell according to claim 1, wherein the first buffer portion extends from the first reactant gas manifold to the power generation region.

8. The fuel cell according to claim 1,
wherein the first buffer portion includes embossed portions.

9. The fuel cell according to claim 1,
wherein the membrane electrode assembly includes a protruding portion protruding from an edge of the membrane electrode assembly.

10. The fuel cell according to claim 9,
wherein the intermediate layer has a protruding shape that corresponds to the protruding portion including a protrusion that extends toward the first reactant gas manifold in a direction orthogonal to the stacking direction.

11. The fuel cell according to claim 1,
wherein the first buffer portion is formed by a portion of the first separator along which the reactant gas flows after exiting or prior to entering the first reactant gas manifold, and
wherein the power generation region is formed by a portion of the electrode catalyst layer in a central portion of the first electrode.

12. The fuel cell according to claim 1,
wherein the intermediate layer of the first electrode has dimensions, as viewed from the stacking direction, that are different than dimensions of the intermediate layer of the second electrode, as viewed from the stacking direction.

13. A fuel cell comprising:
a membrane electrode assembly comprising:
a first electrode including an electrode catalyst layer, an intermediate layer, and a gas diffusion layer;
a second electrode including an electrode catalyst layer, an intermediate layer, and a gas diffusion layer; and
a solid polymer electrolyte membrane provided between the first electrode and the second electrode; and
a first separator stacked on the membrane electrode assembly in a stacking direction, the first separator comprising:
a first reactant gas channel through which a reactant gas is to flow in a space between the first separator and the membrane electrode assembly along a power generation surface of the membrane electrode assembly;
a first reactant gas manifold through which the reactant gas is to flow in the stacking direction; and
a first buffer portion located outside of a power generation region of the electrode catalyst layer of the first electrode, the first buffer portion formed by a portion of the first separator that extends from the first reactant gas channel, the first buffer portion fluidly connecting the first reactant gas channel to the first reactant gas manifold,
wherein the gas diffusion layer of the first electrode extends along a surface of the first separator to a first buffer region of the membrane electrode assembly facing the first buffer portion, and the intermediate layer of the first electrode covers a portion of the gas diffusion layer of the first electrode in the first buffer region,
wherein the first buffer region directly faces, in the stacking direction, a part of the first buffer portion that is disposed directly between the first reactant gas manifold and the first reactant gas channel, and a portion of the intermediate layer of the first electrode in the first buffer region does not overlap the electrode catalyst layer of the first electrode in the stacking direction, and
wherein the portion of the first intermediate layer in the first buffer region that does not overlap the electrode catalyst layer of the first electrode in the stacking direction also does not overlap the electrode catalyst layer of the second electrode in the stacking direction.

14. The fuel cell according to claim 13,
wherein the portion of the first intermediate layer in the first buffer region that does not overlap the electrode catalyst layer of the first electrode in the stacking direction overlaps the part of the first buffer portion in the stacking direction.

15. The fuel cell according to claim 13,
wherein the intermediate layer of the first electrode is disposed between the solid polymer electrolyte membrane and the gas diffusion layer of the first electrode,
wherein the membrane electrode assembly further includes an adhesive layer in the first buffer region, the adhesive layer being located between the solid polymer electrolyte membrane and the intermediate layer of the first electrode, and
wherein the adhesive layer includes an overlapping portion that overlaps an outer peripheral portion of the electrode catalyst layer of the first electrode in the stacking direction.

16. A fuel cell comprising:
a membrane electrode assembly comprising:
a first electrode including an electrode catalyst layer, an intermediate layer, and a gas diffusion layer;
a second electrode including an electrode catalyst layer, an intermediate layer, and a gas diffusion layer; and
a solid polymer electrolyte membrane provided between the first electrode and the second electrode; and
a first separator stacked on the membrane electrode assembly in a stacking direction, the first separator comprising:
a first reactant gas channel through which a reactant gas is to flow in a space between the first separator and the membrane electrode assembly along a power generation surface of the membrane electrode assembly;
a first reactant gas manifold through which the reactant gas is to flow in the stacking direction; and
a first buffer portion located outside of a power generation region of the electrode catalyst layer of the first electrode, the first buffer portion formed by a portion of the first separator that extends from the first reactant gas channel, the first buffer portion fluidly connecting the first reactant gas channel to the first reactant gas manifold,
wherein the gas diffusion layer of the first electrode extends along a surface of the first separator to a first buffer region of the membrane electrode assembly facing the first buffer portion, and the intermediate layer of the first electrode covers a portion of the gas diffusion layer of the first electrode in the first buffer region,
wherein an adhesive layer is disposed in the first buffer region of the membrane electrode assembly, the first buffer region directly faces, in the stacking direction, a part of the first buffer portion that is disposed directly between the first reactant gas manifold and the first reactant gas channel, a portion of the intermediate layer of the first electrode in the first buffer region does not overlap the electrode catalyst layer of the first electrode in the stacking direction, and the adhesive layer is located between the solid polymer electrolyte membrane and the gas diffusion layer of the first electrode, and wherein the portion of the first intermediate layer in the first buffer region that does not overlap the electrode catalyst layer of the first electrode in the stacking direction also does not overlap the electrode catalyst layer of the second electrode in the stacking direction.

17. The fuel cell according to claim 16,
wherein the portion of the first intermediate layer in the first buffer region that does not overlap the electrode catalyst layer of the first electrode in the stacking direction overlaps the part of the first buffer portion in the stacking direction.

18. The fuel cell according to claim 16,
wherein the first buffer portion includes embossed portions.

19. The fuel cell according to claim 16,
wherein the membrane electrode assembly includes a protruding portion protruding from an edge of the membrane electrode assembly.

20. The fuel cell according to claim 19,
wherein the intermediate layer has a protruding shape that corresponds to the protruding portion including a protrusion that extends toward the first reactant gas manifold in a direction orthogonal to the stacking direction.

21. The fuel cell according to claim 16,
wherein the first buffer portion is formed by a portion of the first separator along which the reactant gas flows after exiting or prior to entering the first reactant gas manifold, wherein the power generation region is formed by a portion of the electrode catalyst layer in a central portion of the first electrode.

22. The fuel cell according to claim 16,
wherein the intermediate layer of the first electrode has dimensions, as viewed from the stacking direction, that are different than dimensions of the intermediate layer of the second electrode, as viewed from the stacking direction.

23. The fuel cell according to claim 16,
wherein the adhesive layer is located between the solid polymer electrolyte membrane and the intermediate layer of the first electrode, and wherein the adhesive layer includes an overlapping portion that overlaps an outer peripheral portion of the electrode catalyst layer and the intermediate layer of the first electrode in the stacking direction.

* * * * *